Nov. 3, 1970
R. B. FRIDLEY
3,537,236
HEDGEROW PICKING MACHINE
Filed Oct. 14, 1968
4 Sheets-Sheet 1
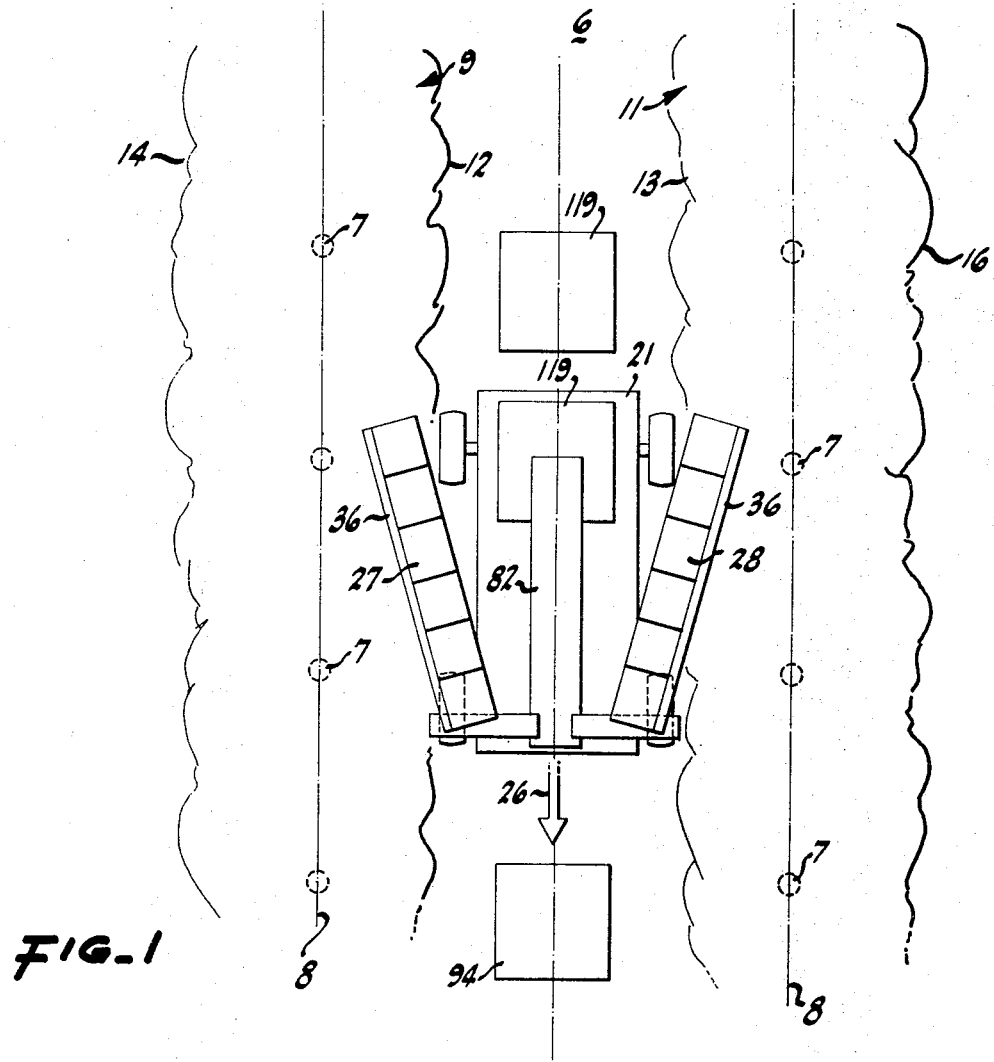
FIG_1
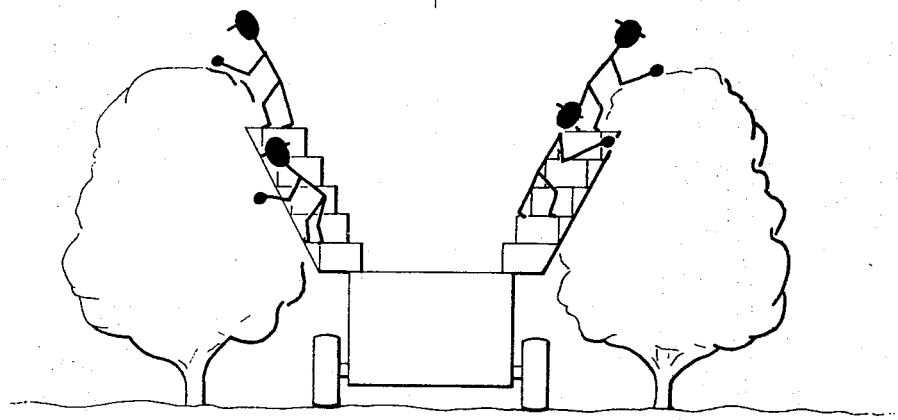
FIG_2
INVENTOR.
ROBERT B. FRIDLEY
BY
Lothrop & West
ATTORNEYS

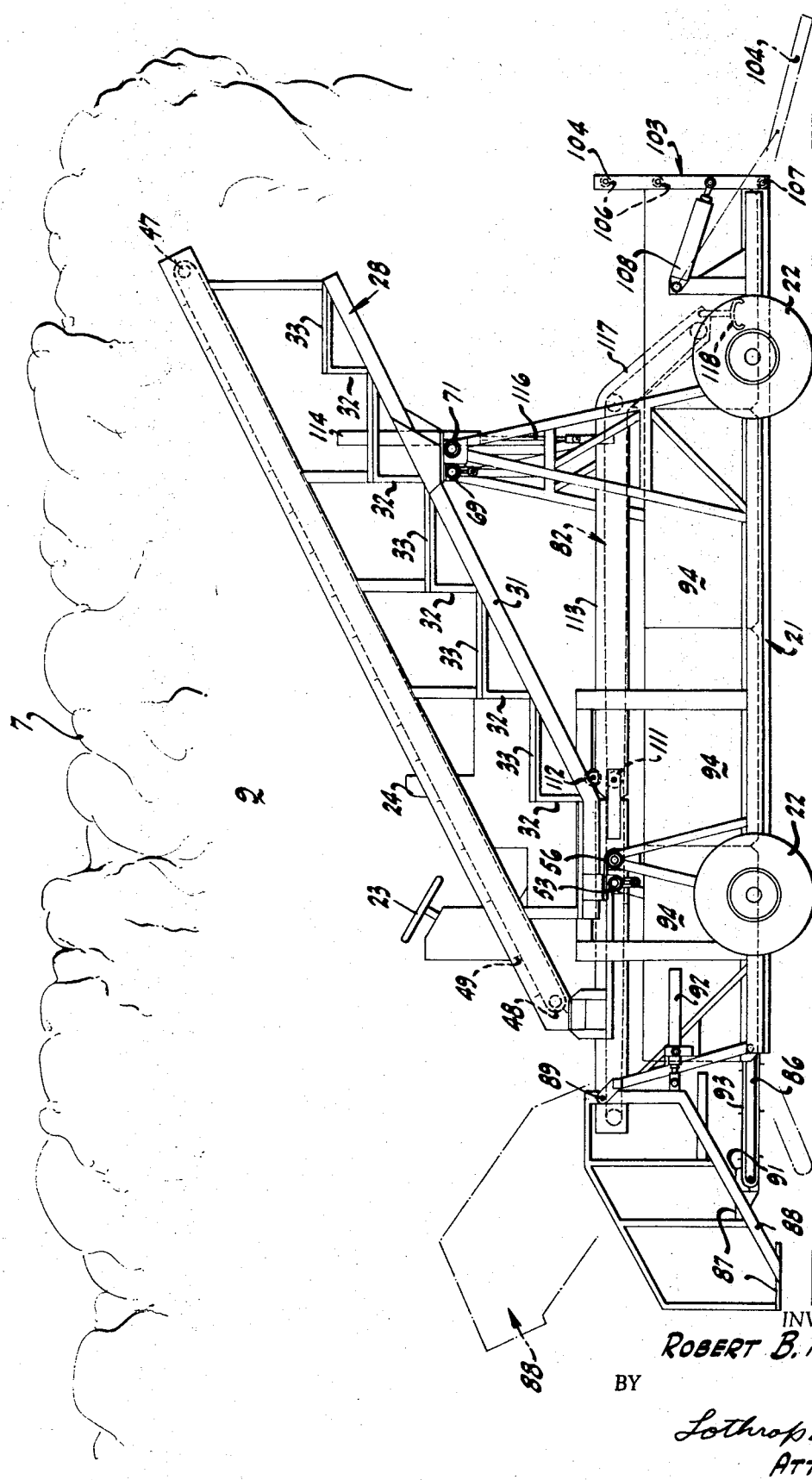

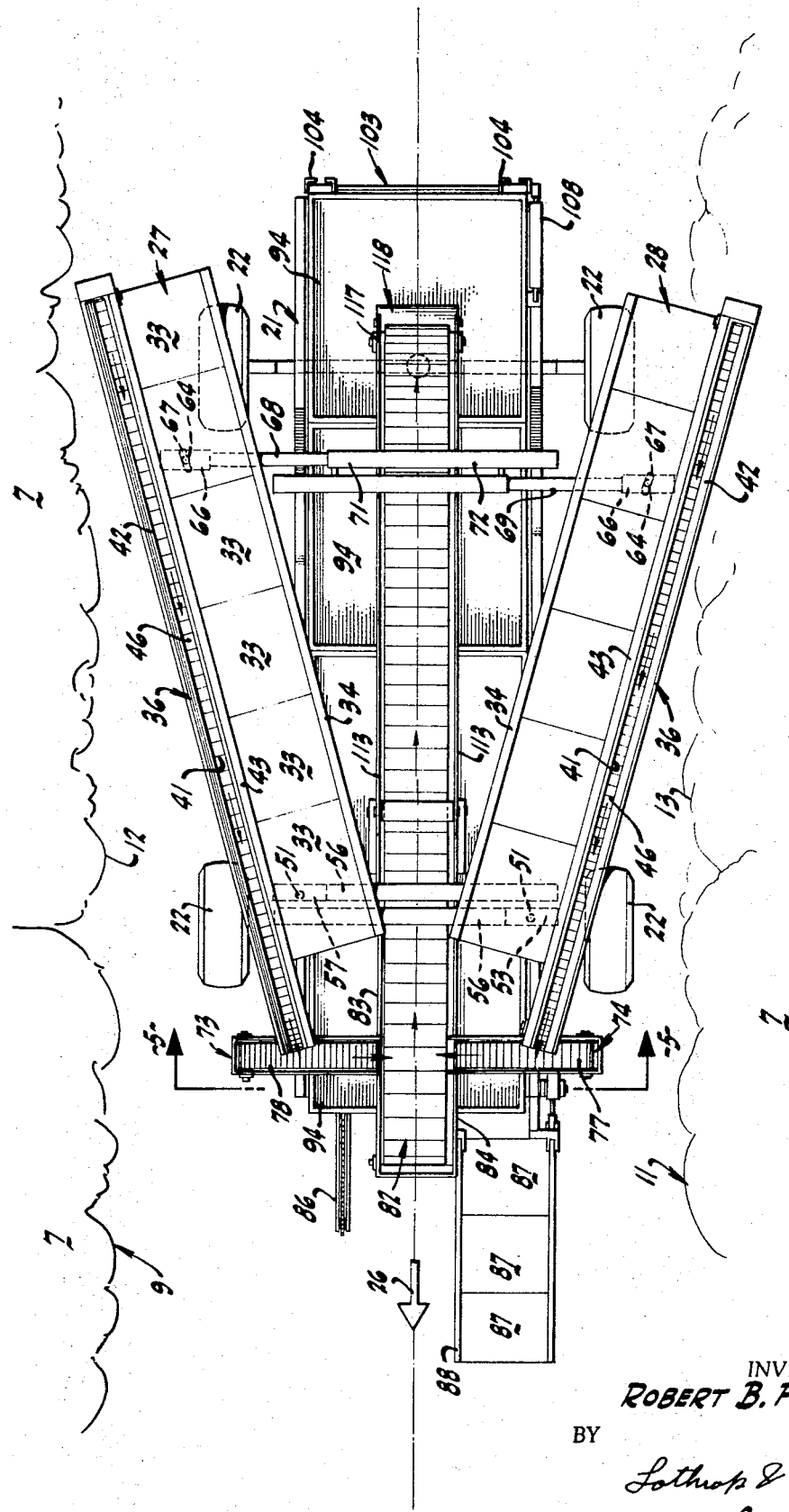

Nov. 3, 1970 — R. B. FRIDLEY — 3,537,236
HEDGEROW PICKING MACHINE
Filed Oct. 14, 1968 — 4 Sheets-Sheet 4
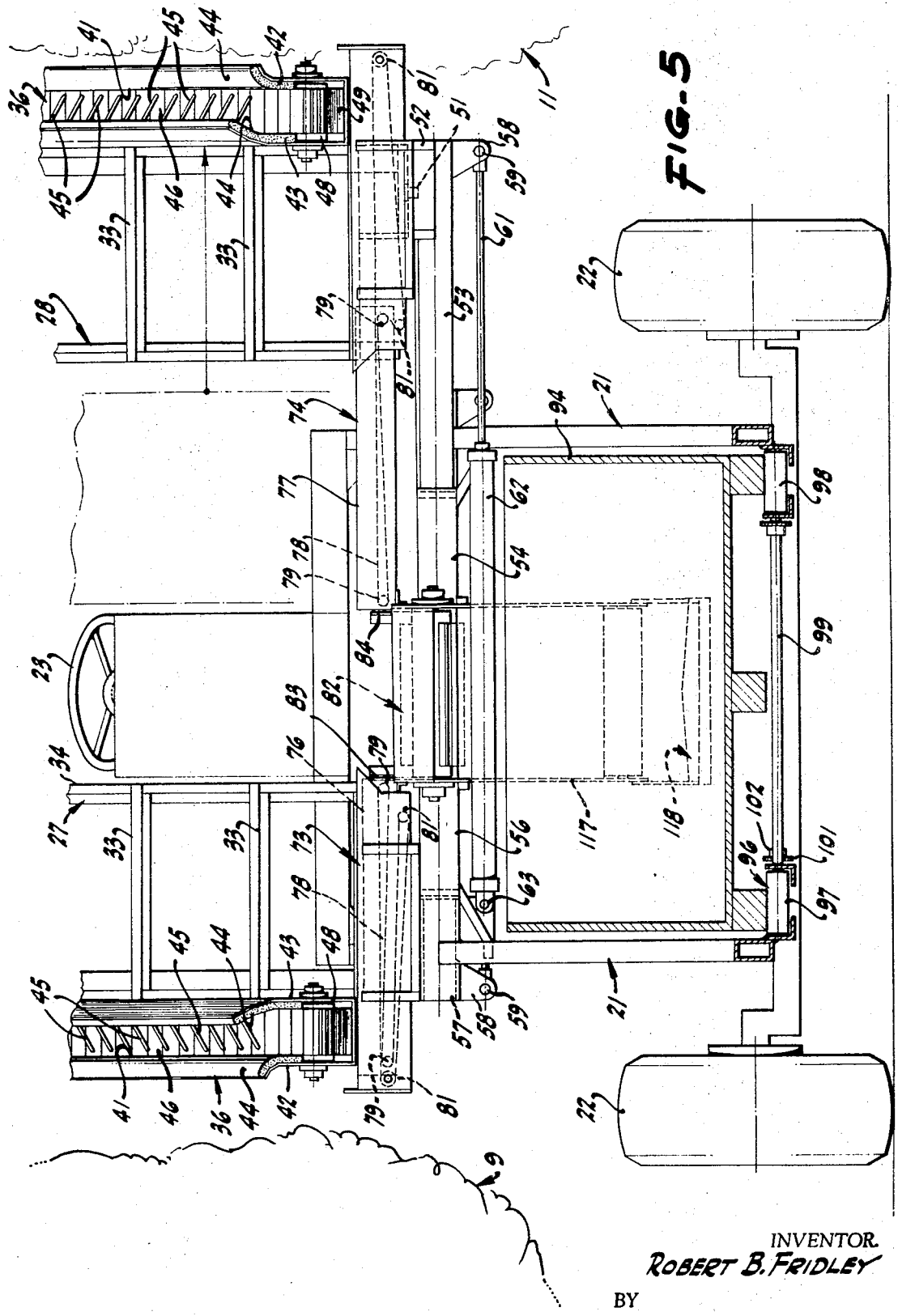
INVENTOR.
ROBERT B. FRIDLEY
BY
Lothrop & West
ATTORNEYS United States Patent Office 3,537,236
Patented Nov. 3, 1970

3,537,236
HEDGEROW PICKING MACHINE
Robert B. Fridley, Davis, Calif., assignor to The Regents of the University of California, Berkeley, Calif.
Filed Oct. 14, 1968, Ser. No. 767,207
Int. Cl. B60p 1/36
U.S. Cl. 53—391                    10 Claims

ABSTRACT OF THE DISCLOSURE

A hedgerow picking machine includes a vehicle adapted to advance between a pair of hedgerows bearing produce such as fruit, the vehicle including a pair of longitudinal stairways low at the front and high at the back mounted to be moved laterally toward and away from the hedgerows and adapted to accommodate pickers standing on the stairway steps. Produce receiving conveyors run along the outboard sides of the stairways and conduct picked produce deposited therein by the pickers to a central conveyor from which the produce is discharged into bins picked up at the front of the vehicle, carried longitudinally of the vehicle and discharge at the rear thereof.

---

In the increasing mechanization of produce harvesting it has been determined that the shape of many produce-yielding plants and their row spacing can conveniently approximate hedgerows. That is, either bushy plants or trees; for example, pear trees herein, are so planted and spaced and are so trimmed and pruned as to afford an aisle between parallel rows of plants or trees but without cross aisles and with the trees virtually merging so that the almost box-shaped trees make longitudinal rows with almost continuous side walls. The trees in each hedgerow are limited to a thickness or transverse dimension of approximately six feet. A picker standing near one side of the hedgerow can conveniently reach in approximately three feet to the center of the hedgerow to retrieve available produce such as pears. Trees are normally permitted to grow to substantially more than the height of a person standing on the ground and are higher than a convenient upward reach. It is presently the practice to pick the produce from the lower portion of the trees with the picker standing on the ground and to pick the upper portion of the tree with the picker standing on a ladder, which must be moved from place to place around the spaced apart trees.

It is therefore an object of the invention to provide a hedgerow picking machine which will facilitate the picking of produce along the hedgerow, particularly at heights above the normal reach of a picker standing on the ground.

Another object of the invention is to provide a hedgerow picking machine which will accommodate a number of pickers simultaneously and which will accommodate simultaneously pickers picking the adjacent sides of two hedgerows.

Another object of the invention is to provide a hedgerow picking machine having picker accommodations which can be moved into different positions with respect to the hedgerow in order to afford convenient access and reach to the various parts of the hedgerow trees.

Another object of the invention is to provide a hedgerow picking machine which will obviate the practice of picking manually into a basket or sack.

A further object of the invention is to provide a hedgerow picking machine that will carry the picked produce gently and without damage from the picking station to a loading station on the vehicle.

Another object of the invention is to provide a hedgerow picking machine in which the now-customary field bins are automatically conveyed through the picking machine while being filled with the picked produce.

Another object of the invention is to provide a hedgerow picking machine which is self-propelled and mechanically conveys the produce.

Another object of the invention is to provide a hedgerow picking machine adapted for the gathering of produce from hedgerows.

A further object of the invention is in general to provide an improved hedgerow picking machine.

Other objects together with the foregoing are attained in the embodiment of the invention described in the accompanying description and illustrated in the accompanying drawings, in which:

FIG. 1 is a diagram showing in plan a hedgerow picking machine of the invention in operating condition;

FIG. 2 is a diagram in front elevation of the operating machine as illustrated in FIG. 1;

FIG. 3 is a side elevation of the hedgerow picking machine;

FIG. 4 is a plan of the hedgerow picking machine; and

FIG. 5 is a cross-section, the plane of which is indicated by the line 5—5 of FIG. 4.

While a hedgerow picking machine pursuant to the invention can be embodied in widely variant forms, particularly dependent upon the precise service desired, and also somewhat dependent upon the nature of the produce being harvested, a suitable example is afforded by one practical embodiment of hedgerow picking machine which has been successfully utilized in connection with the gathering of tree crops such as pears.

The hedgerow picking machine is preferably utilized in an orchard 6 in which a number of trees 7 are planted in one row and other trees are planted in a parallel row 8. The trees are planted somewhat closer together along the line than has previously been the practice for spaced, individual trees and also may be planted with their trunks somewhat closer together than has previously been the case because the tree thickness is limited. When the trees are grown, after appropriate pruning and shaping, there are afforded substantially continuous hedgerows 9 and 11 each defined by substantially vertical, longitudinally extending facing sides 12 and 13 and remote sides 14 and 16 defining the tree shapes. The produce, such as pears, appears on the trees within a short distance of the exterior thereof, a distance usually of the order of three feet from the trunk center line, so that the hedgerows are approximately six feet thick in transverse dimension. Depending upon variety and culture, the trees usually constitute a hedgerow tapering inwardly somewhat toward the top and having a relatively rounded head or longitudinal ridge.

For use in this environment I preferably provide a hedgerow picking machine including a vehicle with a main frame 21 made up of the customary structural shapes and supported on pneumatic, ground-engaging wheels 22. There is a pair of wheels toward one end of the frame and a tracking pair of wheels near the other end of the frame. Conveniently there is a source of power on the frame connected to drive at least one of the pairs of wheels, and there is also provided a steering mechanism 23 at an operator's station 24 on the frame, so that at least one of the pairs of wheels can be steered. The vehicle moves in the direction of the arrow 26 (FIG. 2). The rearward wheels and the forward pair of wheels immediately under the operator's station are steered and all four of the wheels are driven by hydraulic motors.

Particularly in accordance with the invention, the vehicle carries a pair of stairways 27 and 28 arranged generally longitudinally of the vehicle. The stairways and their supports and operating mechanisms are substantially the same on both sides of the vehicle, so that in general the description of one applied to the other. The arrangements are substantially symmetrical about the longitudinal center plane of the vehicle.

Each stairway includes lower supporting beams 31 included in a stairway frame inclined so that their forward end is relatively low and their rearward end is relatively high. The elevation of the forward part of the stairway is such that it corresponds approximately with the shoulder height of a person standing on the ground, and the elevation of the rearward part of the stairway is high enough so that a picker thereon can reach over the upper portion of the hedgerow without difficulty. Supported on the beams 31 are stairs 32 each having a tread 33 of a suitable depth or longitudinal dimension to accommodate a picker facing outwardly or laterally and standing comfortably on both feet. The transverse stair tread dimension is sufficient to permit another picker to move up and down the stairway behind a working picker. Each stairway includes a suitable inner guard rail 34 and as an outer guard rail has a produce-receiving means 36 extending along the stairway at about waist height and at the same inclination as the bottom beams 31.

As particularly shown in cross-section in FIG. 5, each of the produce-receiving means includes a trough 41 defined by an outer wall 42 and an inner wall 43 lined with cushion material 44. The walls are tilted upwardly and laterally outwardly so that a picker standing on an adjacent stair tread can lean over the trough with some comfort and after removing the produce, such as a pear, from a tree can with only a short motion discharge the produce into the upwardly and outwardly inclined mouth of the trough. Should the fruit be thrown into the mouth, flexible retarding fingers 45 along the top of one of the walls 43 reduce its arrival velocity to a safe value.

Since the stairway and trough inclination is relatively steep and for some produce such as pears or peaches, for example, fruit deposited therein would roll too rapidly down the trough and might be injured, there is provided in the bottom of the trough a speed limiting means such as a conveyor 46. This is preferably a flexible belt arranged around an upper roller 47 and a lower roller 48 (FIG. 3), the belt having a plurality of transverse flights 49 spaced apart at a suitable distance and extending upwardly from the plane of the upper run of the belt far enough so that fruit or produce deposited thereon cannot roll more than a very few inches. As the belt advances slowly toward the front of the machine, the produce is carried gently from the rear toward the front and in a downhill direction.

It is possible to fix the stairways on the vehicle, but it has been found in practice that the various hedgerows encountered are sufficiently different in dimension and contour so that different positions of the stairways are helpful in reducing the picker's zone of operation for comfort and efficiency. For that reason, each stairway frame at its lower end is provided with a pivot pin 51 having a vertical axis and connecting the lower frame beams 31 with a supporting plate 52 secured to the inner tube 53 of a transverse support structure. The tube 53 is transversely slidable in a tubular casing 54 fixed on the frame 21. When the tube 53 is telescoped entirely within the casing 54, the lower end of the stairway is closely inboard, whereas when the tube 53 is fully extended, the lower forward end of the stairway is as close as possible to the adjacent hedgerow.

Because of the length and extent of motion of the tube 53, the corresponding supporting casing 56 and the tube 57 for the other side of the vehicle are staggered with respect to the casing 54. Thus, the relatively narrow carriage or vehicle serves as a support for stairways which can be spread apart a substantial distance.

The support tubes 53 and 57 can be moved manually if desired and pinned in place at any selected location, but preferably the operation is performed by power. For that reason, each of the tubes 53 and 57 is provided with ears 58 connected by a pin 59 to the respective piston rod 61 of one of a pair of hydraulic cylinders 62 at its remote end connected by pins 63 to the frame 21 of the vehicle. The paired hydraulic mechanisms are connected in the usual hydraulic circuitry and the devices are operated individually or together under manual control so that the convenience of the pickers adjacent the lower end of the stairways can be closely accommodated.

In a similar fashion, the upper rearward portion of each of the stairways has the beams 31 of the stairway frames connected by a vertical pin 64 to a subjacent plate 66, the connection, however, being by means of a longitudinal slot 67 so that the horizontal angularity of the stairways can be freely changed in any desired degree. The construction of the rear supports is substantially the same as those at front. There are transverse tubes 68 and 69 slidably received in casings 71 and 72 with corresponding hydraulic mechanisms to extend and retract them. Since these mechanisms can also be individually operated by power, it is possible to dispose the stairways parallel to each other (in plan) for transport and at various angular positions. Usually the forward, lower stairway portions are maintained closely inboard and the upper rearward portions are extended outboard in order partially to overlie the tops of the trees in the hedgerow, as shown in FIG. 2.

The motion of the forward ends of the stairways about the pivot mountings, although slightly arcuate, is sufficiently close to transversely rectilinear to permit the conveyors 46 at their lower ends to discharge onto closely adjacent, transverse, telescopic conveyors 73 and 74 leading from just beneath the conveyors 46 to the central portion of the machine. Preferably the conveyors 73 and 74 have telescopic frames 76 and 77 and carry conveyor belts 78 trained in S fashion around appropriate guide roller 79 and 81. When the frames 76 and 77 are moved toward and away from each other there is always presented a continuous upper conveyor run extending transversely to the proper location and of the proper length to carry produce from the discharge of the adjacent conveyor 46 toward the center of the machine.

The telescopic conveyors from the two sides of the machine both feed toward and discharge onto a longitudinally extending, central conveyor 82 provided with appropriate guard boards 83 and 84 at each side and extending for most of the length of the machine. The conveyor 82 is arranged so that the upper run of the central conveyor moves toward the rear of the machine. Preferably the central conveyor, although approximately level, contains flights as well so that produce thereon is not unduly jostled and does not take on undue random motion, but is carefully conveyed from the point of receipt from the transverse conveyors to a point of discharge at an appropriate station on the machine. Although the driving mechanism is not shown, for simplicity, there are appropriate drives, preferably by hydraulic motor, on all of the conveyors, both the stairway conveyors, the transverse conveyors and the central conveyor. They all run approximately at the same surface speed in order that the produce be advanced gently.

It is presently preferred to provide means on the vehicle for receiving the produce carried by the central conveyor. At the present time rectangular, standard bins are the accepted receiving devices. For that reason, there is provided at the front of the main frame 21 a bin pickup frame 86 at its rearward end pivoted to the frame 21. The forward end of the frame 86 can be raised to an upper, substantially horizontal position from a lower position in close proximity to the ground.

For stowing during transport and for convenience in initially mounting the machine, there is provided a series of steps 87 on a framework 88 carried by horizontal pivots 89 at the forward end of the frame 21. In its lowermost position a socket 91 on the framework 88 temporarily engages the pickup frame 86 and holds it in its uppermost position. The stairway is moved by a hydraulic jack 92 mounted on the frame 21 and pivotally connected to the step frame 88. In the position of the parts shown in FIG. 3, the stair frame holds the pickup frame 86 in elevated position. The stair frame is in position to allow the pickers ready access to the various stairways and the driver access to his station.

When the machine has been manned and is ready for operation, the jack 92 can be actuated in either direition to elevate the step frame into the dotted-line position shown in FIG. 3 or to lower the step frame into operating position. Lifting of the step frame simultaneously releases the pickup frame 86, which drops to an inclination with its forward end close to the ground. The pickup frame 86 includes a pair of side chains 93 with lugs on them. As the vehicle advances in the field toward a previously-deposited empty bin 94 (FIG. 1), the empty bin is picked up by the lugs on the chains 93. It is lifted along the inclined pickup frame and is discharged onto a bin conveyor 96 on the frame 21.

The bin conveyor includes a number of transversely extending rollers 97 and 98 on longitudinally spaced cross shafts 99, the various rollers being connected by sprocket chains 101 engaging sprockets 102 on the adjacent shafts. The shafts and rollers are appropriately driven from the power source. All of the rollers 97 and 98 are driven with their upper portions moving toward the rear of the vehicle, so that the bins resting thereon are frictionally propelled toward the rear. The driven rollers 97 and 98 can be augmented, if desired, with intermediate, non-driven, supporting rollers.

In any case, a bin picked up by the pickup frame chains 93 is moved from the front of the vehicle toward the rear thereof and travels to the rear until such time as it encounters a discharge conveyor 103. This conveyor has a frame 104 carrying a plurality of non-driven transversely extending rollers 106 and is movable around a transverse pivot mount 107 by means of hydraulic cylinders 108. The frame 104 is movable between a vertical stop position, as shown by the solid lines in FIG. 3, and a rearwardly and downwardly inclined discharge position, as shown by the broken lines in FIG. 3. In this latter position the discharge conveyor extends from a substantial continuation of the bin conveyor to the ground.

In its uppermost, substantially vertical position the conveyor 103 acts as a stop. A bin advancing along the bin conveyor abuts the vertical discharge frame and can no longer move rearwardly, the driving rollers 97 and 98 simply turning and slipping beneath the bin. It is customary to space the bins such as 94 in the field between the hedgerows so that sufficient bins are picked up to afford a supply virtually filling or partially filling the bin conveyor and always positioning at least one bin in abutment with the upright discharge frame 104.

Included in the hedgerow picking machine, and more particularly disclosed in the copending application of James J. Mehlschau entitled "Filler For Bins" filed Oct. 14, 1968 with Ser. No. 767,073 and assigned to the assignee hereof, is a special means for carrying the produce from the produce conveyor 82 into the rearmost bin, a means for depositing the produce therein quite gently and automatically and a means for discharging the bin when full.

The conveyor 82 is provided with a transverse articulation or pivot 111 about halfway between its ends and with appropriate, transversely extending idle rollers 112. The conveyor frame sides 83 and 84 are continued by sides 113, which can be angled with respect to the sides 83 and 84. The conveyor upper run can be moved from substantially a horizontal location, as shown in FIG. 3, into an upwardly inclined attitude. This motion is accomplished by a hydraulic cylinder 114 and piston 116 mounted on the frame 21 and when energized effective to hold the rear portion of the conveyor frame at the desired elevation. The rearmost portion of the produce conveyor is angled downwardly and rearwardly in an extension 117 so that when the conveyor is lowered the extension approaches the bottom of an adjacent bin.

A directing and sensing mechanism 118 is provided at the end of the portion 117. This not only directs the discharged produce in a forward and rearward direction for even distribution in the surrounding bin, but also has a sensing mechanism which causes the cylinder 114 to be actuated from time to time. When energized by the bin sensing device the cylinder 114 lifts the produce conveyor upwardly step by step until such time as the rearmost bin is filled.

When the conveyor 82 has ascended to its maximum extent, then a signal is given to actuate the hydraulic mechanism 108 and the discharge frame 104 is lowered. Since the rollers 97 and 98 are revolving, the rearmost filled bin is then discharged from the main frame 21 by frictional power. The bin rolls down the rollers 106 onto the ground and is left in a discharged position as shown by the bin 119 in FIG. 1. As soon as the rearmost bin has been discharged, the power-driven rollers 97 and 98 advance all of the other bins in the line until such time as the next rearmost one occupies a position abutting the returned, upright gate. The hydraulic mechanism 108 returns to its original position acting as a stop and at this time the rear portion of the produce conveyor is again lowered into the new, empty bin and the process is repeated.

With this structure, as the vehicle advances down the hedgerows pickers standing on both stairways reach for the produce and with short and convenient motions and without leaving the stair treads detach and discharge the produce into the troughs, from which it is gently carried downwardly to the telescopic conveyors at the front. The produce then discharges onto the produce conveyor and is carried to the bins. As the vehicle advances between the hedgerows, the hydraulic mechanisms at the forward end and at the rearward end can be actuated to move the stairways either farther apart or closer together so that the individual pickers standing on the stairways can be positioned very close to their optimum locations for ease and efficiency of picking. Since the fruit is conveyed carefully throughout the entire cycle, very little bruise damage is had and a relatively easy, efficient picking operation results.

What is claimed is:

1. A hedgerow picking machine comprising ground engaging wheels, a vehicle frame supported on said wheels and adapted to be advanced therewith in the longitudinal direction of and alongside a hedgerow, an elongated stairway, means for supporting said stairway on said vehicle frame with the length of said stairway extending substantially in said direction, said stairway including a plurality of treads each having a dimension measured in said direction sufficient to support a produce picker thereon and facing said hedgerow, means for moving at least one end of said stairway relative to said vehicle frame and toward and away from said hedgerow, means at the longitudinal edge of said stairway nearest said hedgerow for receiving produce picked from said hedgerow, and means for conveying the produce from said receiving means to a station on said vehicle frame.

2. A hedgerow picking machine as in claim 1 in which at least some of said stairway treads have a dimension measured transversely of said direction sufficient to permit a second produce picker to pass thereon behind said mentioned produce picker standing thereon and leaning over said hedgerow.

3. A hedgerow picking machine as in claim 1 including means for positioning said produce receiving means at about the height of the waist of a produce picker on an adjacent one of said treads.

4. A hedgerow picking machine as in claim 1 in which said supporting means supports said stairway and said produce receiving means at a higher elevation at the rear of said vehicle frame than at the front thereof.

5. A hedgerow picking machine as in claim 1 including a bin conveyor adapted to transport a bin thereon and disposed to extend longitudinally of said vehicle frame from the front end thereof to the rear end thereof.

6. A hedgerow picking machine as in claim 5 in which said stairway and said produce receiving means extend along one side of said vehicle frame, and including a duplicate stairway and produce receiving means extending along the other side of the vehicle frame, and a central conveyor on said vehicle frame arranged to convey produce from said produce receiving means and said duplicate produce receiving means to said bin.

7. A hedgerow picking machine as in claim 6 in which said central conveyor extends longitudinally of said vehicle frame over said bin conveyor.

8. A hedgerow picking machine as in claim 7 and including means at the front of said vehicle frame for picking up and delivering a bin to said bin conveyor.

9. A hedgerow picking machine as in claim 7 and including means at the rear of said vehicle frame for discharging a bin from said bin conveyor to the ground.

10. A hedgerow picking machine as in claim 1 including means interconnecting said vehicle frame and said stairway for individually moving the forward and rearward ends of said stairway relative to said vehicle frame and toward and away from said hedgerow.

References Cited
UNITED STATES PATENTS

| | | | |
|---|---|---|---|
| 469,751 | 3/1892 | Sincennes | 182—38 |
| 2,035,537 | 3/1936 | Cowan et al. | 182—127 XR |
| 2,606,078 | 8/1952 | Brock | 214—83.1 |
| 3,258,142 | 6/1966 | Girardi | 214—83.1 |
| 3,396,816 | 8/1968 | Kennedy | 182—49 |
| 3,437,174 | 4/1969 | Coblentz et al. | 182—129 XR |

ALBERT J. MAKAY, Primary Examiner

U.S. Cl. X.R.

182—63, 131; 214—83.1, 83.26